United States Patent

Sakai et al.

[11] Patent Number: 5,903,722
[45] Date of Patent: May 11, 1999

[54] NETWORK OF DATA PROCESSING APPARATUSES HAVING TRANSMISSION MODES WITH DIFFERENT BLOCK SIZES

[75] Inventors: Masanori Sakai, Yokohama; Tadashi Suzuki, Tokyo; Satoru Kutsuwada, Kawasaki; Satoshi Kaneko; Akihiko Sakai, both of Kawasaki; Yoshinori Abe, Tama, all of Japan

[73] Assignee: Canon Kabushiki Kaisha, Tokyo, Japan

[21] Appl. No.: 08/422,164

[22] Filed: Apr. 14, 1995

[30]      Foreign Application Priority Data

Apr. 15, 1994  [JP]  Japan ..................... 6-077216

[51] Int. Cl.⁶ .............. G06F 17/30; H04N 1/32
[52] U.S. Cl. ............... 395/200.3; 395/200.53; 395/200.54; 395/200.58; 395/200.66; 358/468; 358/475
[58] Field of Search ................. 395/250, 200.2, 395/183.01, 185.04, 200.3, 200.31, 200.53, 200.54, 200, 185, 200.58, 200.66; 355/202, 233; 358/298, 530, 486, 497, 468, 475; 382/162, 299

[56]           References Cited

U.S. PATENT DOCUMENTS

| | | | |
|---|---|---|---|
| 4,993,025 | 2/1991 | Vesel et al. ............... | 370/450 |
| 5,023,716 | 6/1991 | Nakayama et al. .......... | 348/420 |
| 5,109,434 | 4/1992 | Shimizu et al. ............ | 382/276 |
| 5,274,782 | 12/1993 | Chalasani et al. .......... | 395/311 |
| 5,402,208 | 3/1995 | Ohmura et al. ............. | 399/2 |
| 5,488,454 | 1/1996 | Fukada et al. .............. | 399/1 |
| 5,530,907 | 6/1996 | Pavey et al. ............... | 395/889 |
| 5,552,894 | 9/1996 | Aiba ......................... | 358/298 |
| 5,552,901 | 9/1996 | Kikuchi et al. ............. | 358/468 |
| 5,566,176 | 10/1996 | Chang ...................... | 395/200.58 |
| 5,661,569 | 8/1997 | Yamanaka ................. | 358/442 |
| 5,664,105 | 9/1997 | Keisling et al. ............ | 395/200.54 |

FOREIGN PATENT DOCUMENTS 4322846  1/1994  Germany ............ H04N 1/32

*Primary Examiner*—Krisna Lim
*Assistant Examiner*—Bharat Barot
*Attorney, Agent, or Firm*—Morgan & Finnegan, L.L.P.

[57]            ABSTRACT

In an information processing system in which an input apparatus (10) which can input information and can transmit the input information, and a processing apparatus (7) which can process received information are connected to a network (4), and which system can realize a function of inputting and processing information by the network as a whole, information input by the input apparatus is controlled to be divisionally or simultaneously transmitted in correspondence with the relationship between the input apparatus (10) and the processing apparatus (7) in the network.

18 Claims, 14 Drawing Sheets

| ADDRESS | ID | APPARATUS TYPE | APPARATUS ATTRIBUTE |
|---------|----|----------------|---------------------|
| ⋮ | ⋮ | ⋮ | ⋮ |

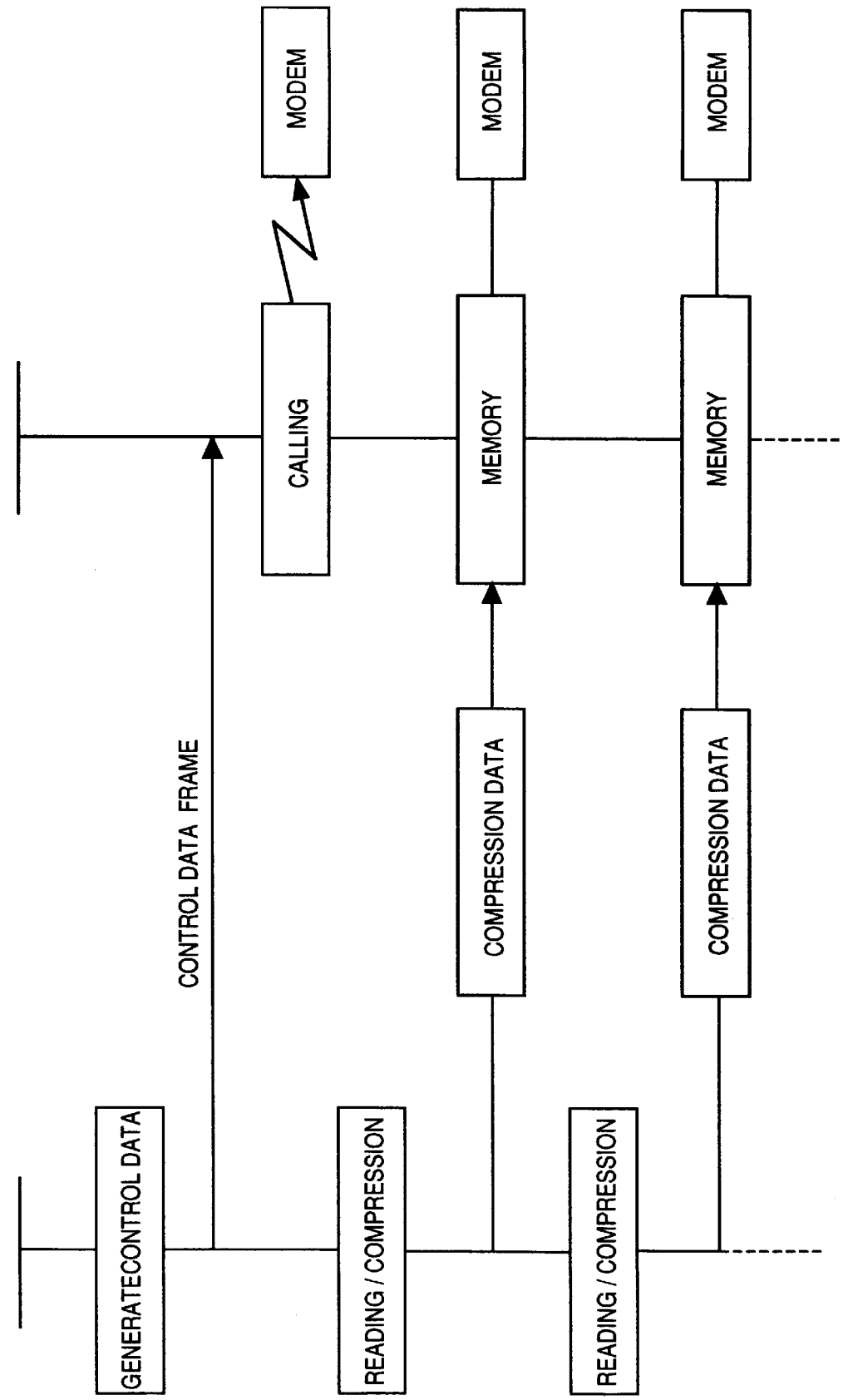

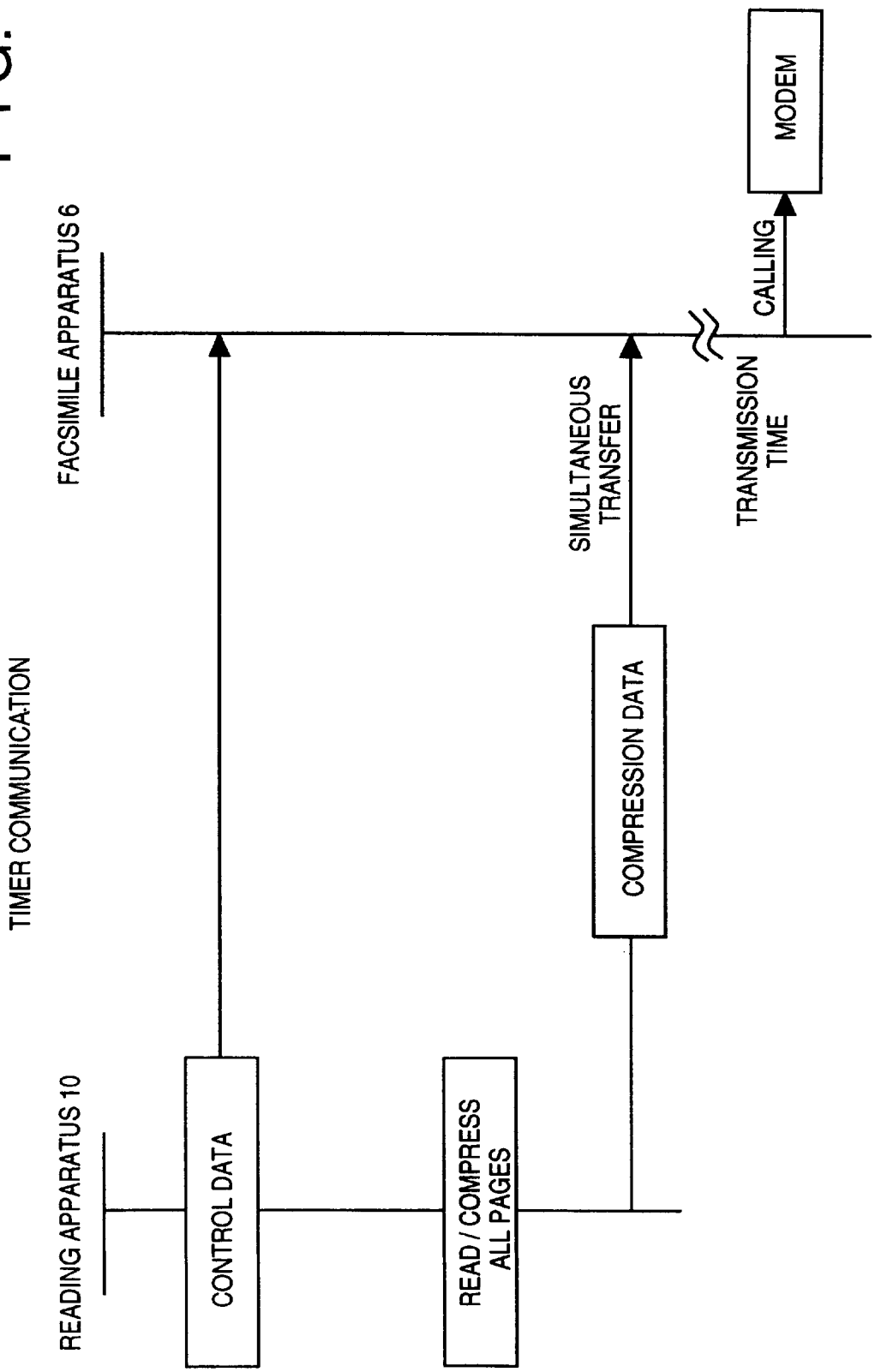

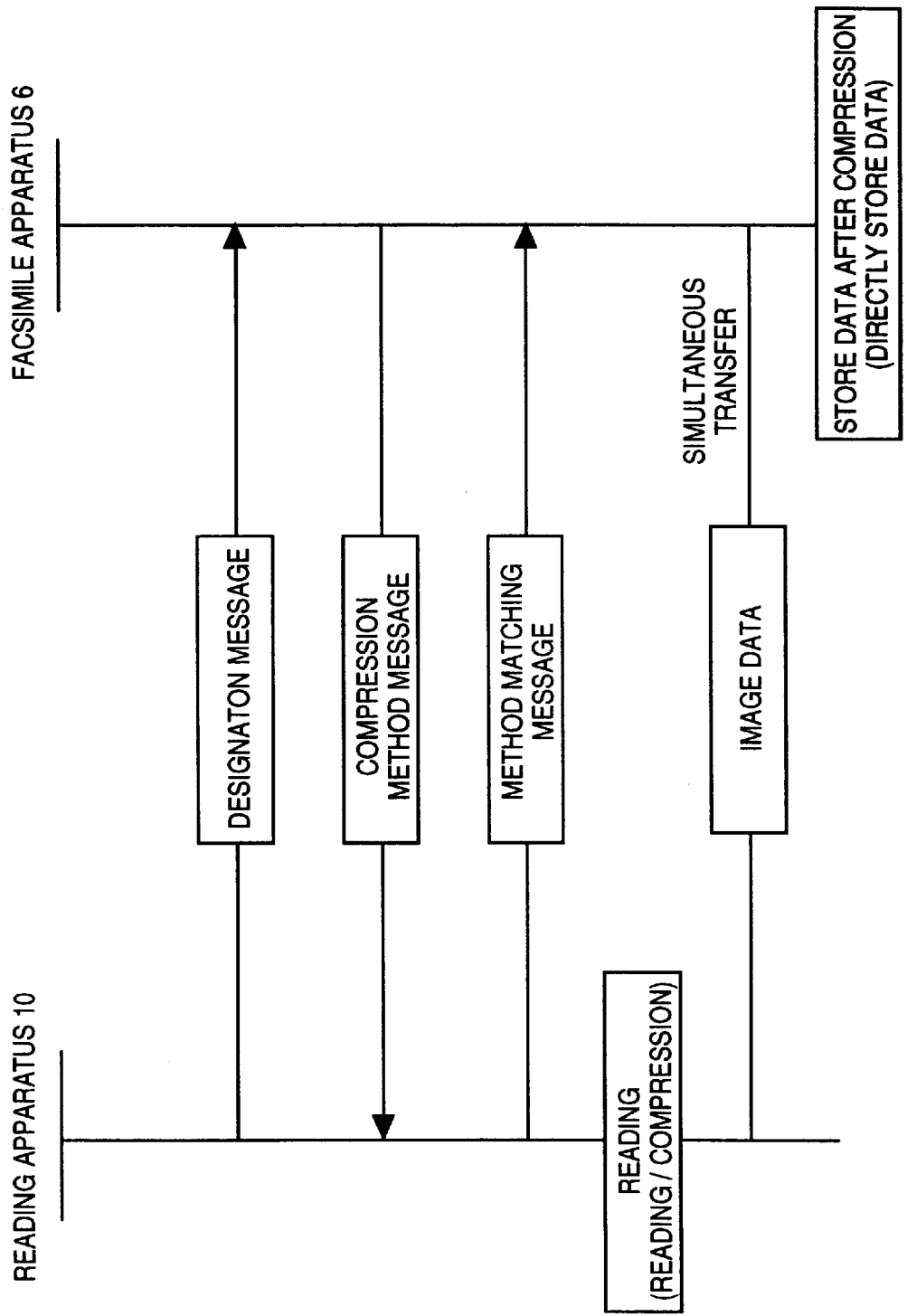

NETWORK OF DATA PROCESSING APPARATUSES HAVING TRANSMISSION MODES WITH DIFFERENT BLOCK SIZES

BACKGROUND OF THE INVENTION

The present invention relates to an information processing system including at least an input apparatus and a processing apparatus, an information processing apparatus used in the system, and a data transfer control method in a network.

In a network technique that has been proposed recently, a plurality of apparatuses, especially, a scanner apparatus, a printer apparatus, a facsimile device, and a management apparatus for managing these apparatuses, are connected to a network, and the entire network operates as one system.

Conventionally, when an image is read using the scanner connected to the network, and the read image data is transmitted to another apparatus on the network, the entire image data input in a single scanner input operation is normally transferred as one unit.

For this reason, even when only an image of a portion of an original is required, the entire page of the original must be transmitted. On the contrary, when images on a plurality of pages of an original are successively input, image data for the plurality of pages must be divisionally transmitted since they exceed one unit.

For this reason, the conventional network system has poor data transfer efficiency when a read image is transmitted to another processing apparatus on the network.

SUMMARY OF THE INVENTION

It is, therefore, an object of the present invention to provide an information processing system and an information processing apparatus, which can control communications in correspondence with the communication state in a network.

In order to achieve the above object, according to the present invention, there is provided an information processing system having an input apparatus capable of inputting image data and transmitting the input image data, a processing apparatus capable of processing a received image, and a network to which the input and processing apparatuses are connected, the system realizing a function for inputting and processing image data as a whole, comprising:

control means for controlling to transmit image data input by the input apparatus divisionally or simultaneously in correspondence with a communication state in the network.

In order to achieve the above object, there is also provided an information processing apparatus connected to a network, for exchanging image data with the network, comprising:

means for inputting image data;

means for detecting a communication state in the network; and control means for controlling to transmit image data input by the input means divisionally or simultaneously onto the network in correspondence with the detected communication state.

According to a preferred aspect of the present invention, the control means controls transmission in correspondence with a data traffic in the network.

According to another preferred aspect of the present invention, the control means is included in the input apparatus.

According to still another preferred aspect of the present invention, the input apparatus comprises an image input/output apparatus for reading an image, and outputting the read image.

According to still another preferred aspect of the present invention, when the input apparatus comprises a reading device which reads an original, the control means detects a communication state, and controls the input apparatus to transmit a portion or the entire page of a read original image in correspondence with the detected communication state.

According to still another preferred aspect of the present invention, the input apparatus comprises a reading device which reads an original, the control means detects a communication state, and controls the input apparatus to transmit read image data of originals in units of unitary page or in units of a plurality of pages.

It is another object of the present invention to provide an information processing system and an information processing apparatus, which can control communications in correspondence with the processing mode on the processing apparatus side.

In order to achieve the above object, according to the present invention, there is provided an information processing system having an input apparatus capable of inputting image data and transmitting the input image data, a processing apparatus capable of processing a received image, and a network to which the input and processing apparatuses are connected, the system realizing a function for inputting and processing image data as a whole, comprising:

control means for setting a different transmission sequence of image data from the input apparatus to the processing apparatus in correspondence with a processing manner of image data on the processing apparatus side.

In order to achieve the above object, there is also provided an information processing apparatus, which is connected to a network, and exchanges image data with the network, comprising:

means for inputting image data; and control means for transmitting designation information for designating a processing manner in a processing apparatus which processes input image data to the processing apparatus, and controlling to divisionally or simultaneously transmit image data input by the input means in correspondence with a processing manner.

According to a preferred aspect of the present invention, the control means determines the processing manner of image data on the processing apparatus side in the input apparatus, and informs the determination result to the processing apparatus side.

According to another preferred aspect of the present invention, the control means is arranged in the input apparatus.

According to still another preferred aspect of the present invention, the processing manner of image data on the processing apparatus side is defined such that an image input operation in the input apparatus and processing of image data in the processing apparatus are substantially simultaneously performed.

According to still another preferred aspect of the present invention, the processing manner of image data on the processing apparatus side is defined such that processing of image data in the processing apparatus is started after an image input operation in the input apparatus is completed.

According to still another preferred aspect of the present invention, the processing manner of image data on the processing apparatus side is defined such that processing of image data in the processing apparatus is started at a time different from an input time of an image in the input apparatus.

According to still another preferred aspect of the present invention, the input apparatus comprises an image reading device, and the processing apparatus comprises a facsimile device.

According to still another preferred aspect of the present invention, when the input apparatus comprises an image reading device, and the processing apparatus comprises a facsimile device, the processing manner is an immediate transmission mode, and the control means transfers image data to the processing apparatus in units of lines.

According to still another preferred aspect of the present invention, when the input apparatus comprises an image reading device, and the processing apparatus comprises a facsimile device, the processing manner is a timer transmission mode, and the control means simultaneously transfers image data stored in a buffer and transmission time data to the processing apparatus.

According to still another preferred aspect of the present invention, when the input apparatus comprises an image reading device, and the processing apparatus comprises a facsimile device, the processing manner is a buffer transmission mode, and the control means simultaneously transfers image data stored in a buffer to the processing apparatus.

It is still another object of the present invention to provide an information processing system and an information processing apparatus which can control communications depending on whether the format of information in an input apparatus is the same as or different from that on the processing apparatus side.

In order to achieve the above object, according to the present invention, there is provided an information processing system, which comprises an input apparatus capable of inputting image data and transmitting the input image data, a processing apparatus capable of processing a received image, and a network to which the input and processing apparatuses are connected, the system realizing a function for inputting and processing image data as a whole, comprising:

control means for controlling a format of image data to be output from the input apparatus to the processing apparatus on the basis of a matching state between characteristics of image data processed by the input apparatus and characteristics of image data processed by the processing apparatus.

In order to achieve the above object, there is also provided an information processing apparatus, which is connected to a network, and exchanges image data with the network, comprising:

means for inputting image data;

means for acquiring processing characteristics of image data in a processing apparatus for processing the image data from an external apparatus; and control means for controlling to divisionally or simultaneously transmit image data input by the input means in correspondence with a matching state between characteristics of image data of the input means, and the processing characteristics of image data in the processing apparatus.

According to a preferred aspect of the present invention, the matching state of the characteristics of image data is a matching state between compression methods of the input apparatus and the processing apparatus.

According to another preferred aspect of the present invention, the input apparatus comprises first compression means, the processing apparatus comprises second compression means, and the control means disables the first compression means when a compression method of the first compression means is different from a compression method of the second compression means.

According to still another preferred aspect of the present invention, the input apparatus comprises first compression means, the processing apparatus comprises second compression means, and the control means enables the first compression means when a compression method of the first compression means is the same as a compression method of the second compression means.

According to still another preferred aspect of the present invention, the processing apparatus comprises a computer, a facsimile communication modem, a printer, a file, and the like.

It is still another object of the present invention to provide an information processing system and an information processing apparatus, which can exchange information in a format most suitable for an information processing apparatus constituting a network.

In order to achieve the above object, according to the present invention, there is provided an information processing system, which comprises an input apparatus capable of inputting image data and transmitting the input image data, a processing apparatus capable of processing a received image, and a network to which the input and processing apparatuses are connected, the system realizing a function for inputting and processing image data as a whole, comprising:

control means for controlling to divisionally or simultaneously transmit data input by the input apparatus in correspondence with a relationship between the input apparatus and the processing apparatus in the network.

It is still another object of the present invention to provide a data transfer control method which can improve the efficiency of a network by controlling the data amount which is a transfer unit in correspondence with the degree of data traffic in the network.

In order to achieve the above object, according to the present invention, there is provided a data transfer control method between communication apparatuses in a network including a plurality of communication apparatuses, comprising the steps of:

detecting a busy rate of the network; and increasing/decreasing an amount of data which is a transfer unit in correspondence with the detected busy rate.

It is still another object of the present invention to provide a data transfer control method which can improve the efficiency of a network by controlling the data amount which is a transfer unit in correspondence with any time difference when the data input timing and the data processing timing are different between apparatuses in the network.

In order to achieve the above object, according to the present invention, there is provided a data transfer control method from a data input apparatus to a data processing apparatus in a network including the data input apparatus and the data processing apparatus, comprising the steps of:

detecting a time difference between an input time of data in the data input apparatus and a processing time of the data in the processing apparatus; and increasing/decreasing an amount of data which is a transfer unit in correspondence with the detected time difference.

It is still another object of the present invention to provide a data transfer control method which can distribute functions and processing loads of an input apparatus and a processing apparatus when both the input and processing apparatuses in a network have pre-processing functions.

In order to achieve the above object, there is provided a data control method from a data input apparatus to a data processing apparatus in a network including the data input apparatus having a first pre-processing function and the data processing apparatus having a second pre-processing function equivalent to the first pre-processing function, comprising the steps of:

discriminating a matching state between the first and second pre-processing functions, and informing a discrimination result to the data processing apparatus; and executing pre-processing in the input apparatus and transferring pre-processed data to the processing apparatus when the first and second pre-processing functions are the same, and transferring data before pre-processing to the processing apparatus when the first and second pre-processing functions are different from each other; and determining in accordance with the information in the processing apparatus whether or not the second pre-processing function is executed for the data sent from the data input apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 13 is a chart showing the data transfer sequence in an immediate transmission mode;

FIG. 14 is a chart showing the data transfer sequence in a timer transmission mode; and FIG. 15 is a chart showing the data transfer sequence in a file operation of image data.

DETAILED DESCRIPTION OF THE PREFERRED EMBODIMENTS

The preferred embodiments of the present invention will be described below with reference to the accompanying drawings.

System Arrangement

Figure 1:
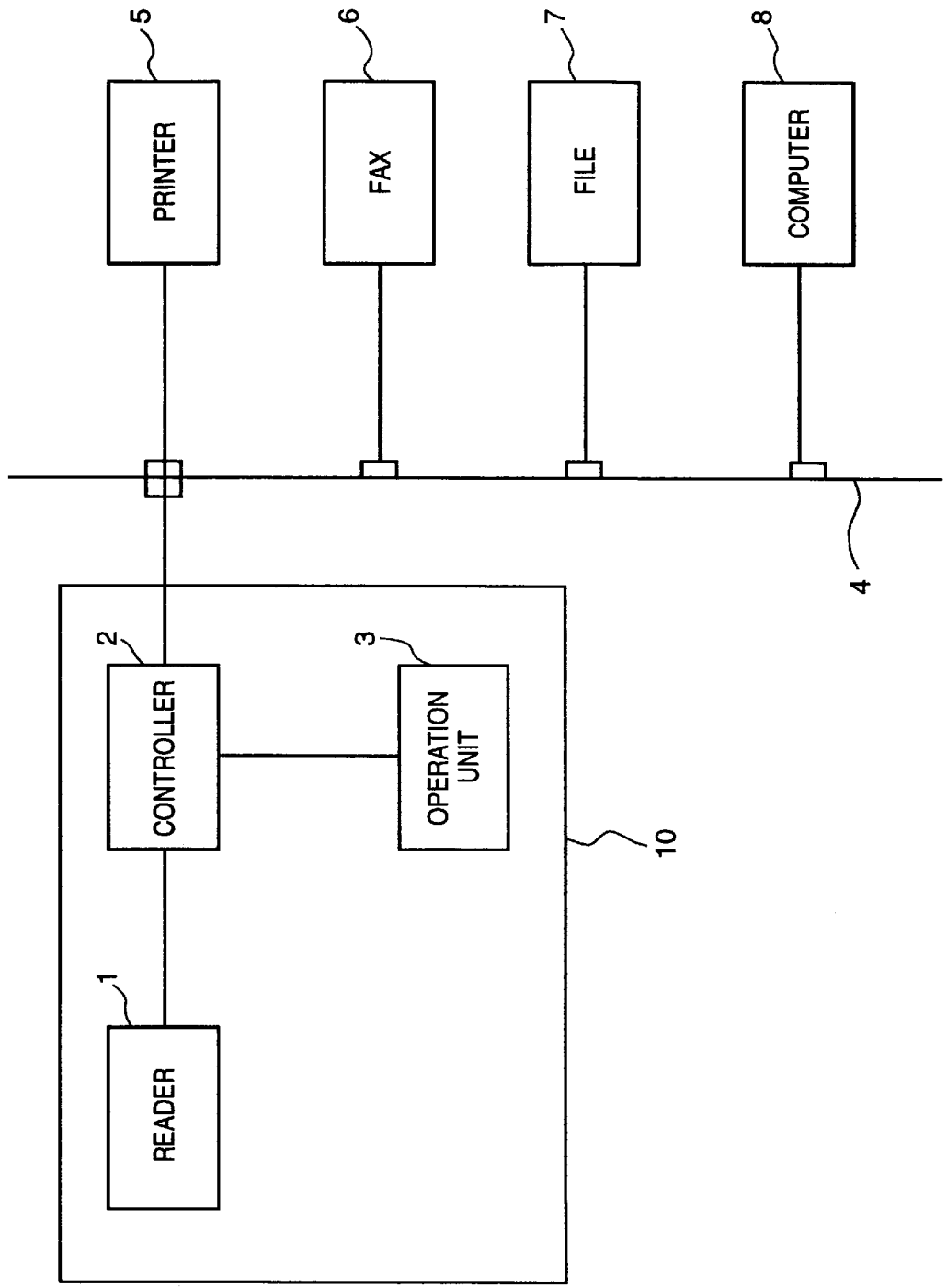
FIG. 1 is a block diagram showing the entire information processing system according to an embodiment of the present invention.

FIG. 1 is a block diagram showing the arrangement of an information processing system according to an embodiment of the present invention.

Referring to FIG. 1, this system constitutes a LAN (local area network) connected to a communication line (network) 4. An image reading device 10 for reading an image, a printer apparatus 5 for printing an image on a paper sheet, a facsimile device 6 for transmitting or receiving an image via a telephone line, a file apparatus 7 for storing an image or reading out the stored image, and a computer apparatus 8 for receiving an image and editing the received image are connected to the communication line 4. These apparatuses are respectively assigned with identifiers indicating the types of apparatuses, and address numbers on the network.

In this system which is characterized in that an image is transmitted, and the transmitted image is received, the image reading device 10 is classified as an image input apparatus, the printer apparatus 5 is classified as an image output apparatus, and the facsimile device 6, the file apparatus 7, and the computer apparatus 8 are classified as image input/output apparatuses. From the viewpoint of a function capable of inputting an image, the image reading device 10, the facsimile device 6, the file apparatus 6, and the computer apparatus 8 are also image input apparatuses.

The system arrangement shown in FIG. 1 will be described in more detail below.

Image Reading device 10

The image reading device has a reader 1 for reading an original image, and converting the read image into image data, a controller 2 for controlling image data from the reader 1, and an operation unit 3 which is connected to the controller 2 and used to designate an output method of image data from the reader 1.

Reader 1

Figure 2:
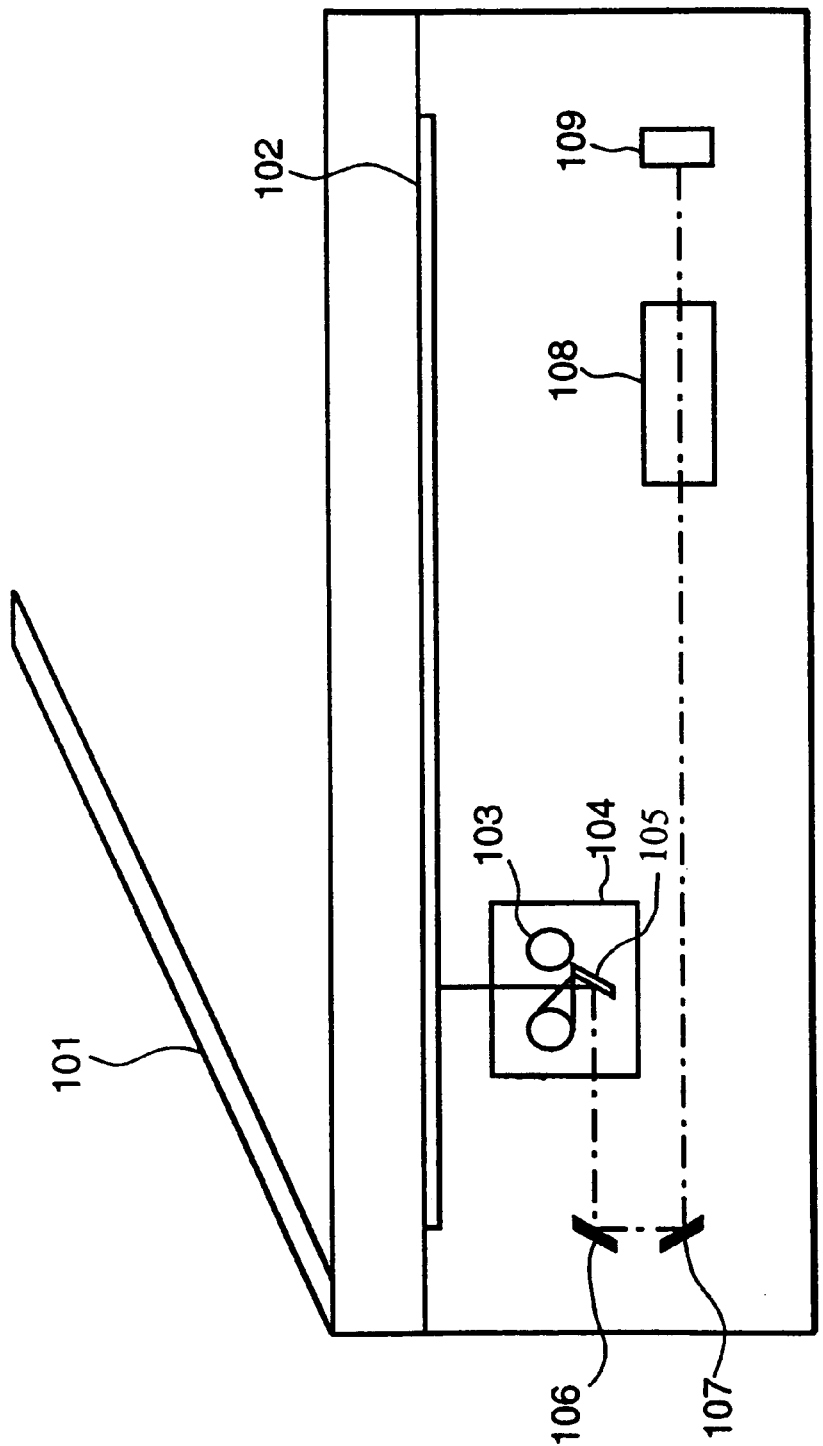
FIG. 2 is a sectional view showing the arrangement of a reader 1 in a reading device 10.

FIG. 2 is a sectional view showing the arrangement of the reader 1.

Originals stacked on an original feeder 101 are fed onto an original table glass surface 102 one by one. When an original is fed, a lamp 103 of a scanner is turned on, and a scanner unit 104 moves to irradiate light onto the original. Light reflected by the original is transmitted through a lens 108 via mirrors 105, and 107 in turn, and thereafter, is input to a CCD image sensor unit (to be referred to as a CCD hereinafter) 109.

Figure 3:
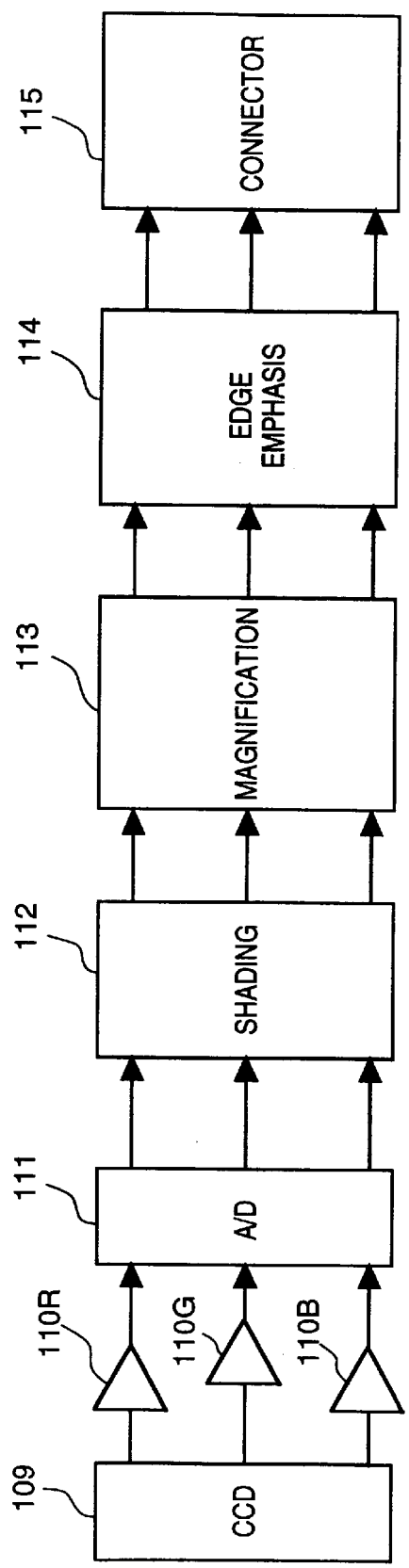
FIG. 3 is a block diagram showing an image processing unit in the reader 1 in the reading device 10.

FIG. 3 is a block diagram showing the signal processing arrangement of the reader 1.

Image information input to the CCD 109 is photoelectrically converted into electrical signals. Color information signals from the CCD 109 are amplified by amplifiers 110R, 110G, and 110B in correspondence with the input level of an A/D converter 111. Output signals from the A/D converter 111 are input to a shading circuit 112, and are subjected to correction of illumination nonuniformity of the lamp 103 and of sensitivity nonuniformity of the CCD 109. Output signals from the shading circuit 112 are input to a magnification circuit 113. The magnification circuit 113 attains magnification in the main scanning direction. Magnification in the sub-scanning direction is attained by changing the scanning speed of the scanner unit 104. An edge emphasis circuit 114 attains edge emphasis by emphasizing high-frequency components of signals from the magnification circuit 113. Output signals from the edge emphasis circuit 114 are output to the controller 2 via a connector 115.

Controller 2 and Operation Unit 3

Figure 4:
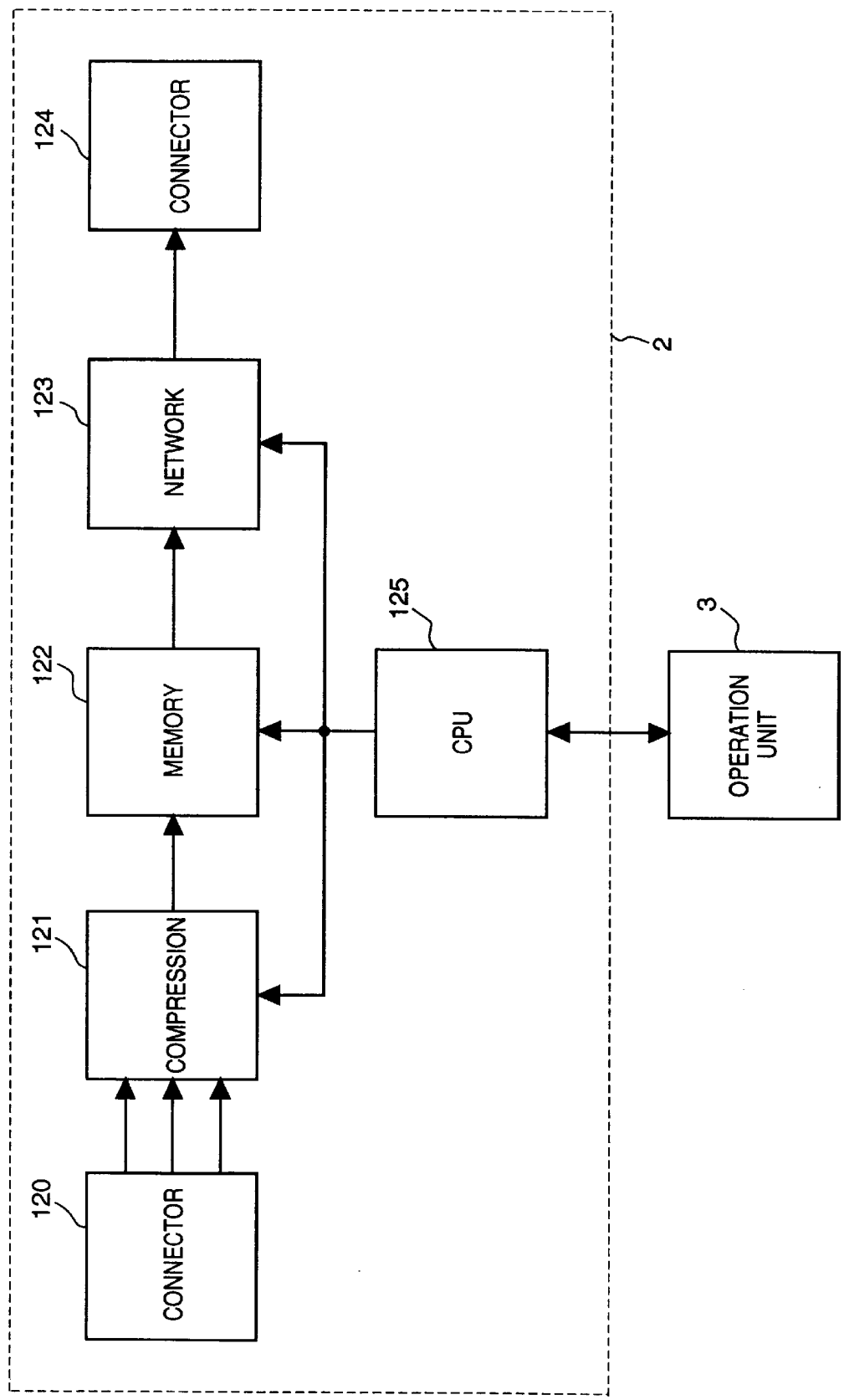
FIG. 4 is a block diagram of a controller 2 and an operation unit 3 in the reading device 10.

FIG. 4 is a block diagram showing the controller 2 and the operation unit 3.

Referring to FIG. 4, a connector 120 includes a terminal for receiving image data from the reader 1. Signals input via the connector 120 are input to a compression circuit 121. An output signal from the compression circuit 121 is input to a memory 122. A signal output from the memory 122 is output onto the network 4 via a network interface 123 and a connector 124. A CPU 125 controls the overall controller 2 and receives information input from the operation unit 3.

Figures 5, 6:
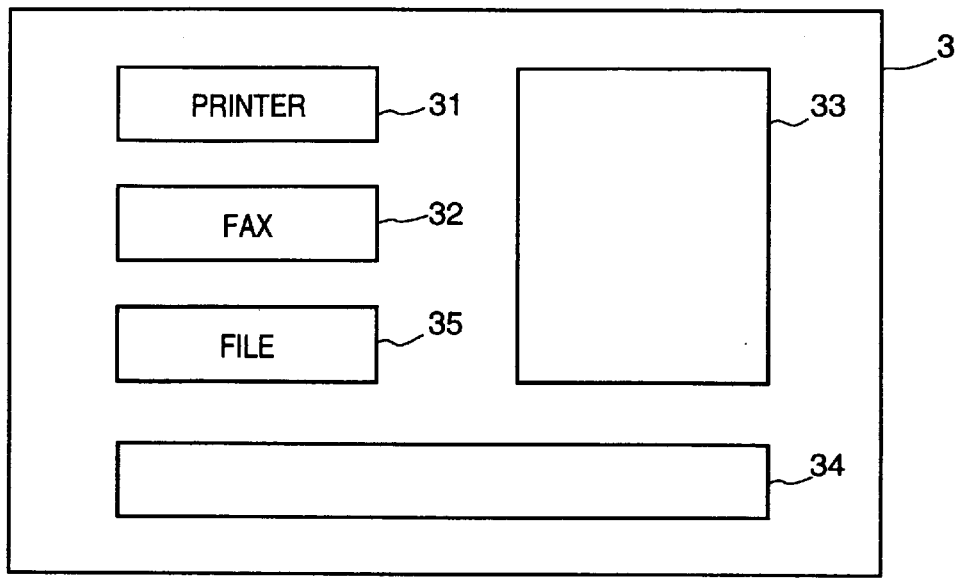
FIG. 5 is a view showing the panel layout of the operation unit 3.
FIG. 6 is a view for explaining the scheme for designating respective apparatuses in the system.

FIG. 5 shows the layout of buttons on the panel of the operation unit 3. On the panel, a printer switch 31 for designating an output destination of an image read by the reader 1 to the printer apparatus 5, a FAX switch 32 for designating an output destination of an image read by the reader 1 to the facsimile device 6, a ten-key pad 33, and the like are arranged.

In this system, all the apparatuses connected to the network have a table representing the network configuration, as shown in FIG. 6. This table is configured in the order of addresses assigned to the apparatuses on the network 4, and stores an identification name of an apparatus assigned to the corresponding address value, the type of the apparatus (such as a facsimile device, a printer apparatus, and the like), and the attribute of the apparatus in units of apparatuses.

A user of this system can designate an apparatus, from which image data read by the image reading device 10 is to be output, by depressing the switch 31 or 32 or by the identifier or address of the apparatus. For example, when image data is to be output via a printer, the user depresses the printer switch 31. When only one printer is connected to the system, the printer apparatus 5 is designated to be the output destination by only depressing the printer switch 31. If a plurality of apparatuses having printer attributes are connected to the network 4, a message, which indicates that a plurality of printers are connected and urges a user to select one of printers, is displayed on a display 34.

On the other hand, when the user depresses the FAX switch 32 to facsimile-transmit image data read by the image reading device 10, a message urging a user to input the telephone number of a transmission destination appears on the display 34. The user inputs the telephone number of the transmission destination using the ten-key pad 33. Then, the display 34 displays a message urging a user to designate a facsimile transmission mode. The transmission mode includes an immediate transmission mode for immediately performing transmission, a timer transmission mode for performing facsimile transmission at a designated time, and the like, and serial numbers are assigned to these transmission modes. The user designates a desired transmission mode by inputting a number using the ten-key pad. When the timer transmission mode is designated, the display 34 further displays a message urging a user to input a transmission designation time. The user inputs the transmission time using the ten-key pad 33.

Printer Apparatus 5

The arrangement and operation of the printer apparatus 5 will be described below with reference to FIG. 7.

Figure 7:
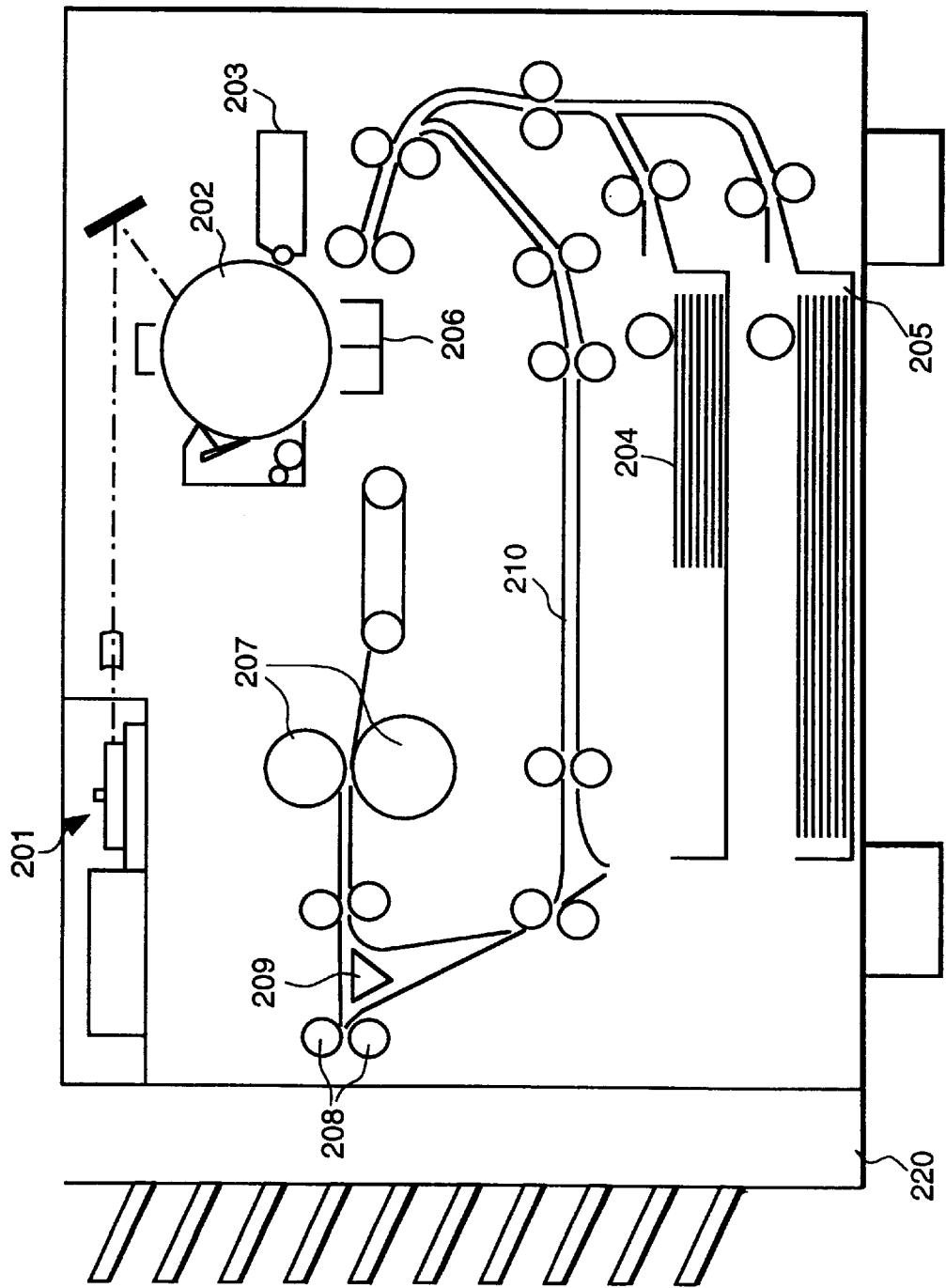
FIG. 7 is a schematic view showing the arrangement of a printer apparatus 5.

Referring to FIG. 7, a signal input to the printer apparatus 5 is converted into an optical signal by an exposure controller 201, and the optical signal is irradiated onto a photosensitive body 202 in accordance with an image signal. A latent image formed on the photosensitive body 202 by the irradiated light is developed by a developer 203. A transfer sheet is fed from a transfer sheet stacking unit 204 or 205 in synchronism with the development timing, and the developed image is transferred from the photosensitive body 202 onto the transfer sheet in a transfer unit 206. The transferred image is fixed on the transfer sheet in a fixing unit 207, and the transfer sheet is exhausted outside the apparatus via an exhaust unit 208. When a sort function of a sorter 220 is enabled, the transfer sheet output via the exhaust unit 208 is exhausted onto a corresponding one of bins of the sorter 220; when the sort function is disabled, the transfer sheet is exhausted onto the uppermost bin of the sorter 220.

A method of outputting two images on two surfaces of a single output sheet will be explained below. After an output sheet subjected to fixing in the fixing unit 207 is temporarily fed to the exhaust unit 208, the feed direction of the sheet is reversed, and the output sheet is then fed to a stacking unit 210 via a feed direction switching member 209. In the stacking unit 210, the sheet on one surface of which an image is printed waits for a re-feed operation for printing an image on the other surface of the sheet. When the next original to be read is ready, an original image is read in the same manner as in the above-mentioned process. In this case, since the output sheet is fed from the re-feed stacking unit 210, two original images can be output onto two surfaces of a single output sheet.

Facsimile device 6

Figure 8:
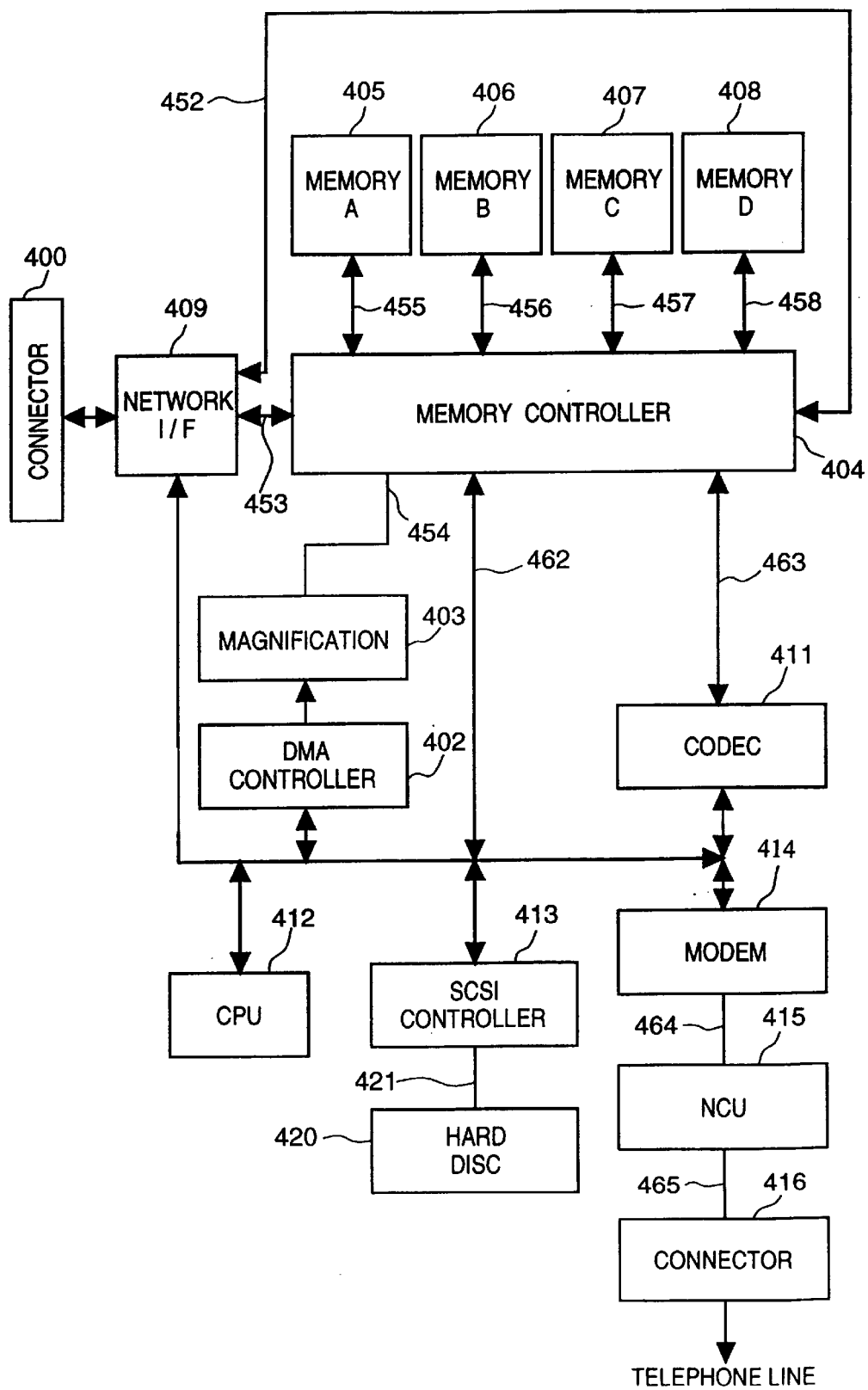
FIG. 8 is a block diagram showing a facsimile device 6.

FIG. 8 is a block diagram showing the detailed arrangement of the facsimile device 6.

The facsimile device 6 is connected to the network 4 via a connector 400. A signal input via the connector 400 is input to a network interface circuit 409, and is then input to a memory controller 404 via a signal line 453.

This facsimile device has four memory banks (a memory A 405, a memory B 406, a memory C 407, and a memory D 408). Each of the memories A 405, B 406, C 407, and D 408 has a capacity of 2 Mbytes, and can store an image of A4 size or equivalent at a resolution of 400 dpi.

When image data from the image reading device 10 is to be stored in one of the memories A 405 to D 408, a signal 453 from the network interface circuit 409 is input to the memory controller 404, and the image data is stored in one of the memories A 405 to D 408 or in two cascade-connected memories under the control of the memory controller.

The memory controller 404 has four control modes for data transfer to the memories, and a CPU 412 sets the controller 404 in one of the four modes. The four control modes include a mode for exchanging data between the memories A 405 to D 408 and a CPU bus 462, a mode for exchanging data with a CODEC bus 463 of a CODEC 411 (with an encoding/decoding function), a mode for exchanging the contents of the memories A 405 to D 408 with a bus 454 from a magnification circuit 403 under the control of a DMA controller 402, a mode for storing image data 453 from the network interface circuit 409 in one of the memories A 405 to D 408, and a mode for reading out the memory contents of one of the memories A 405 to D 408, and outputting the readout contents onto a signal line 452.

A SCSI controller 413 performs interface control with a hard disk 420 connected to the facsimile device 6 via a SCSI bus 421. The hard disk 420 accumulates image data in a facsimile transmission mode or a facsimile reception mode.

The CODEC 411 reads out image information stored in one of the memories A 405 to D 408, encodes the readout information by a desired one of MH, MR, and MMR methods, and thereafter, re-stores the encoded information in one of the memories A 405 to D 408. On the other hand, the CODEC 411 reads out encoded information stored in one of the memories A 405 to D 408, decodes the readout information by a desired one of MH, MR, and MMR methods, and thereafter, re-stores the decoded information in one of the memories A 405 to D 408 as image information.

A MODEM 414 has a function of modulating encoded information from the CODEC 411 or the hard disk connected to the SCSI controller 413 to transmit it onto a telephone line, and a function of demodulating information sent from an NCU 415. The demodulated encoded information is transferred to the CODEC 411 or the hard disk 420 connected to the SCSI controller 413 as encoded information. The NCU 415 is directly connected to the telephone line, and exchanges information with an exchange equipped in a telephone office in a predetermined protocol.

File Apparatus 7

Figure 9:
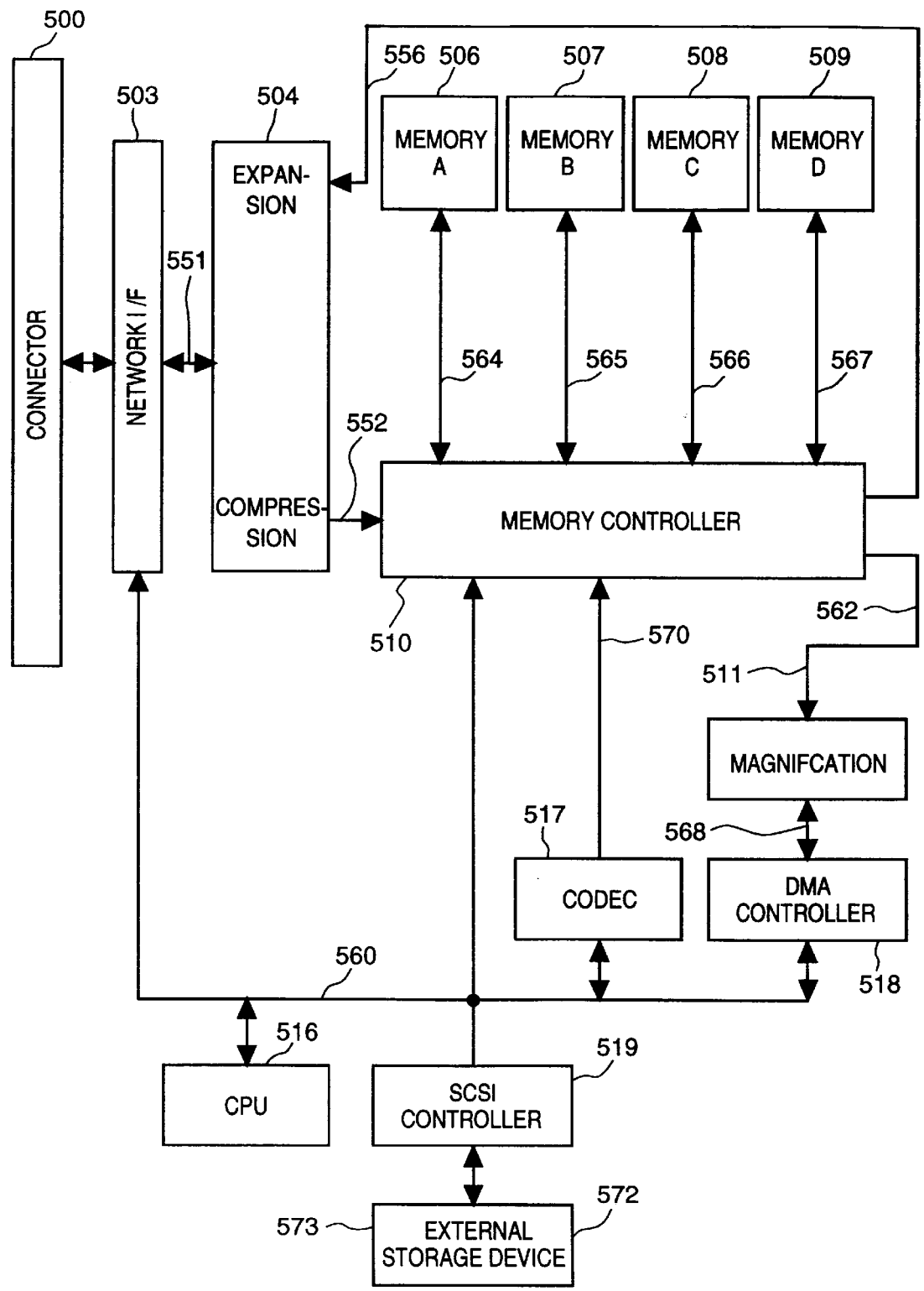
FIG. 9 is a block diagram showing a file apparatus 7.

FIG. 9 is a block diagram showing the detailed arrangement of the file apparatus 7.

The file apparatus 7 is connected to the network 4 via a connector 500. A signal input via the connector 500 is input to a network interface circuit 503, and is then input to a compression/expansion circuit 504 via a signal line 551. An input signal 551 from the network is input to the compression/expansion circuit 504, and is converted from multi-value image information to compressed information. The converted information is then output to a memory controller 510.

An output signal 552 from the compression/expansion circuit 504 is stored in one of a memory A 506, memory B 507, memory C 508, and memory D 509, or two cascade-connected memories under the control of the memory controller 510.

The memory controller 510 of the file apparatus 7 has five control modes. One of these control modes is set by a CPU 516. The five control modes include a mode for exchanging data between the memories A 506 to D 509 and a CPU bus 560, a mode for exchanging data with a CODEC bus 570 of a CODEC 517, a mode for exchanging data between the memories A 506 to D 509 and a bus 562 of a magnification circuit 511 under the control of a DMA controller 518, a mode for storing a signal 511 from the network interface circuit 503 in one of the memories A 506 to D 509, and a mode for reading out the memory contents of one of the memories A 506 to D 509, and outputting the readout memory contents onto a signal line 556.

Each of the memories A 506 to D 509 has a capacity of 2 Mbytes, and can store an image of A4 size or equivalent at a resolution of 400 dpi.

A SCSI controller 519 attains an interface with an external storage device 573 connected to the file apparatus 7. The external storage device 573 comprises, e.g., a magnetooptical disk device, and stores data such as image information.

The CODEC 517 reads out image information stored in one of the memories A 506 to D 509, encodes the readout information by a desired one of MH, MR, and MMR methods, and thereafter, re-stores the encoded information in one of the memories A 506 to D 509. On the other hand, the CODEC 517 reads out encoded information stored in one of the memories A 506 to D 509, decodes the readout information by a desired one of MH, MR, and MMR methods, and thereafter, re-stores the decoded information in one of the memories A 506 to D 509 as image information.

Functions in Network

In this system, many functions are defined as those for attaining one function using a plurality of apparatuses. For example, the functions include:

i: Print Function
  ii: Facsimile Function
  iii: Image Filing Function

Print Function

When an image is printed on a paper sheet by the printer apparatus 5, an image read by the reading device 10 is printed, an image stored in the file apparatus 7 is read out and printed, an image edited by the computer apparatus 8 is printed, or an image received by the facsimile device 6 is printed.

Facsimile Function

When an image is facsimile-transmitted to a distant station, an image to be transmitted is generated by the reading device 10, is read out from the file apparatus 7, or is edited by the computer apparatus 8, and such an image is transmitted by the facsimile device 6.

In this system, image data is exchanged among the apparatuses via the network 4. Image data transfer via the network 4 should be attained in various data transfer modes depending on the natures of the apparatuses to be used. For this purpose, in this system, the following functions are available:

Each of the apparatuses has a function of transmitting transfer data while dividing it into a plurality of blocks or simultaneously transmitting a plurality of pages of image data in correspondence with the communication state (data traffic amount) on the network 4. In this embodiment, the communication state is defined by the busy rate of the communication line of the network 4.

The transmission method of image data from a transfer source to a transfer destination is controlled in correspondence with the processing modes of image data in the apparatus as the transfer destination. In this embodiment, the processing modes include, e.g., an immediate processing mode, time designation processing mode, non-time designation processing mode, simultaneous processing mode, and divisional processing mode.

Whether or not the transfer source compresses image data is selected in correspondence with the compression method of the apparatus as the transfer destination.

Frame Format

Figure 10:
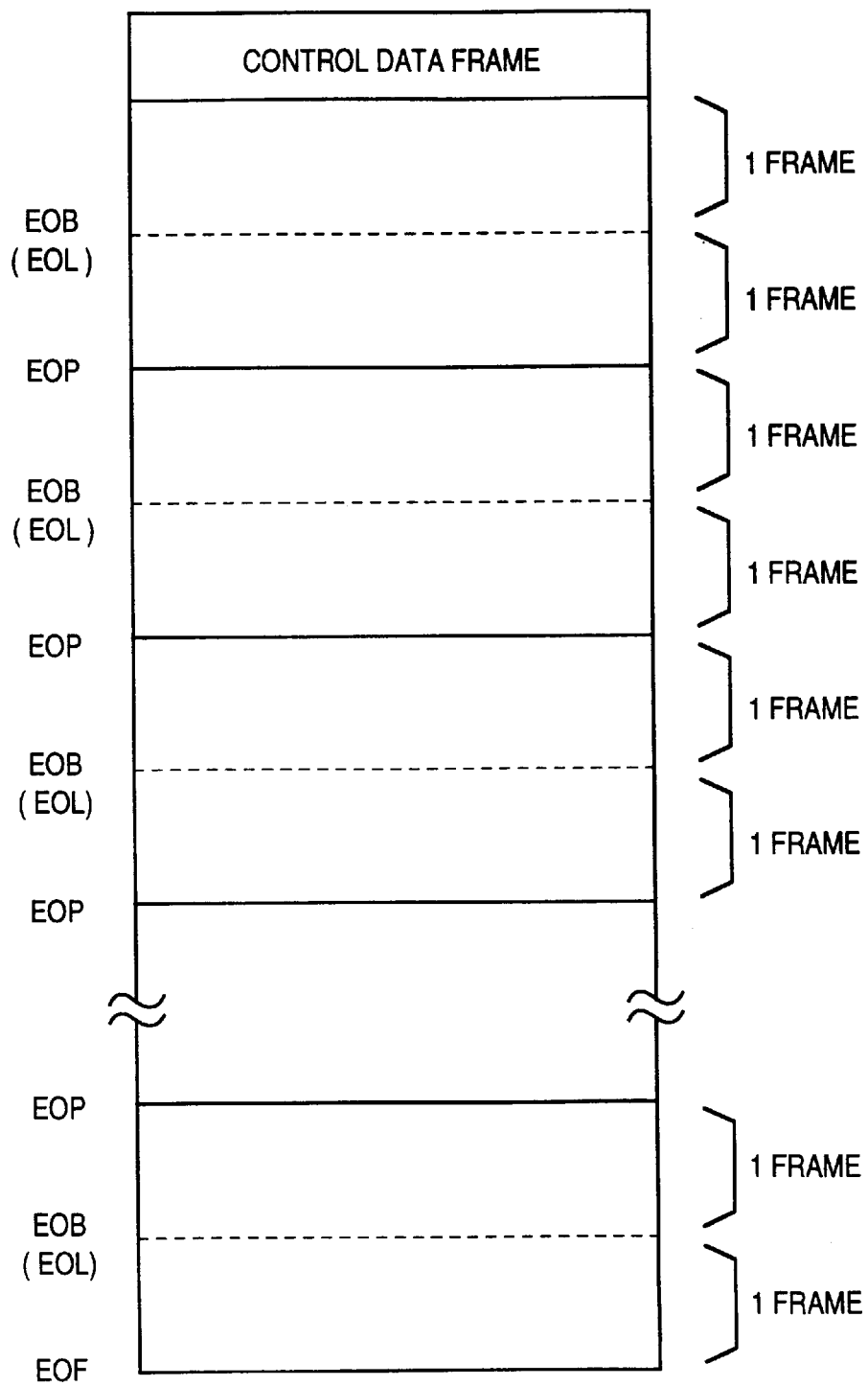
FIG. 10 is a view showing the dividing format of frames on the network.

In this network system, image data is transferred in units of frames. FIG. 10 shows the format of image data used in this system.

Referring to FIG. 10, control data as initial data designates by which apparatus and how image data is to be processed. This control data is transmitted as one frame prior to transmission of image data. The control data frame is followed by an image data frame.

Image data for each page is divided by an EOP (end of page) code. The EOP code is added upon creation of image data. The end of an image file is delimited by an EOF code. The EOF code is similarly added upon creation of image data.

In this network system, image data can be transferred in units of 2 pages, 1 page, or half page (uniquely divided by 1 Mbyte).

In a half-page transfer mode, a network interface (network I/F) of the transmitting apparatus inserts an EOB (end of block) every 1 Mbytes in image data for one page.

In this network, a mode in which one frame includes further segmented image data is defined in addition to the above-mentioned 1-page transfer mode, half-page transfer mode, and 2-page transfer mode. More specifically, one frame can include image data for one line. In this mode, a network interface of the transmitting apparatus inserts an EOL (end of line) at the end of each line upon transmission.

FIG. 10 exemplifies a correspondence between frames and data in the half-page transfer mode.

Transfer Control According to Communication State

Figure 11:
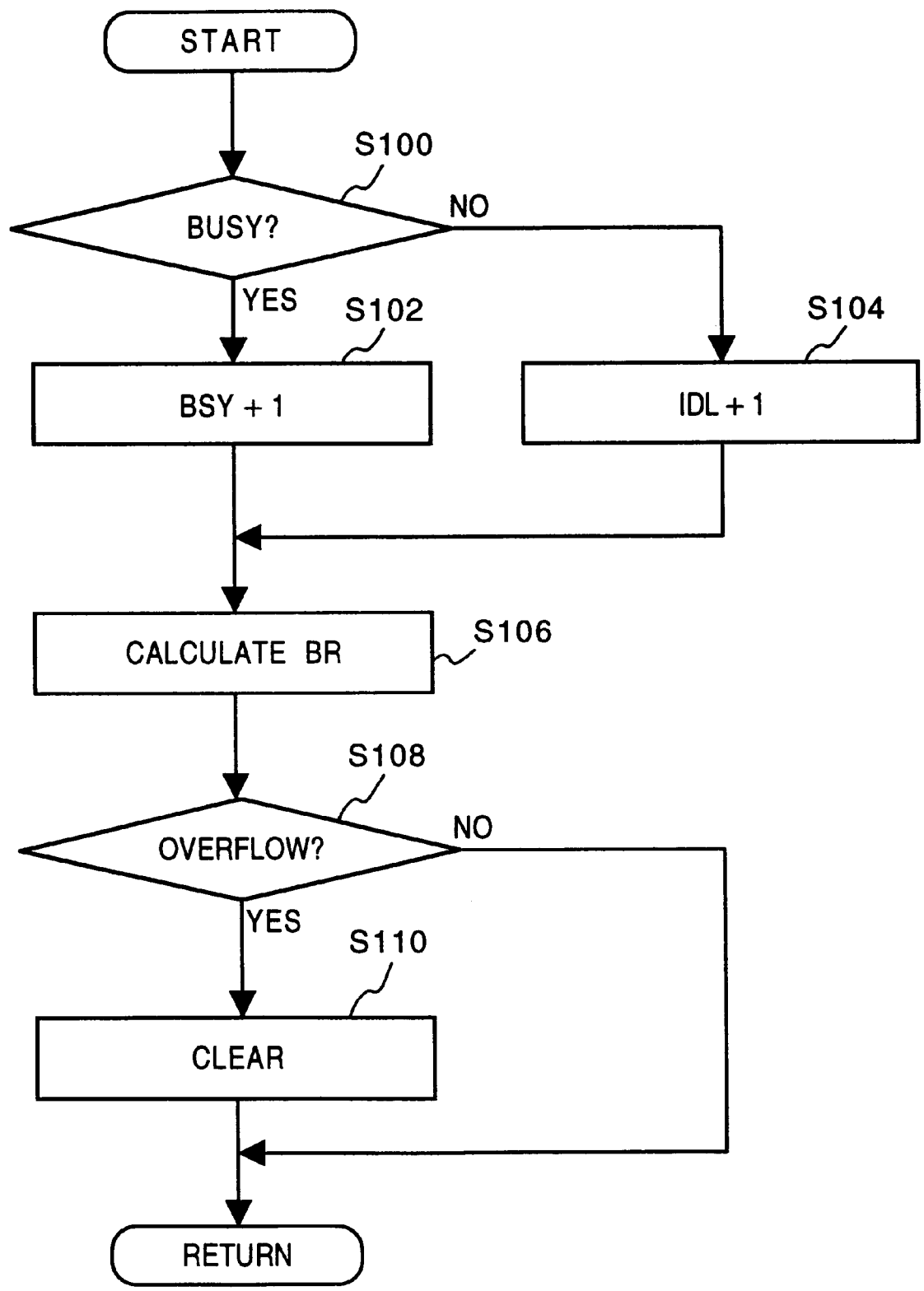
FIG. 11 is a flow chart showing the control sequence for detecting a busy state on the network.

FIG. 11 shows the control sequence for detecting a busy rate BR of signal lines of the network 4, which is executed every unit time by each apparatus of the network 4. When a carrier signal is output onto a signal line, each apparatus determines that the signal line is used by another apparatus, i.e., is busy. If the signal line is busy, the value of a counter BSY indicating a busy state is counted up in step S102; otherwise, the value of a counter IDL indicating an idle state is counted up in step S104. In step S106, the busy rate BR is calculated by: When one of these counters overflows, the two counters are reset.

Figure 12:
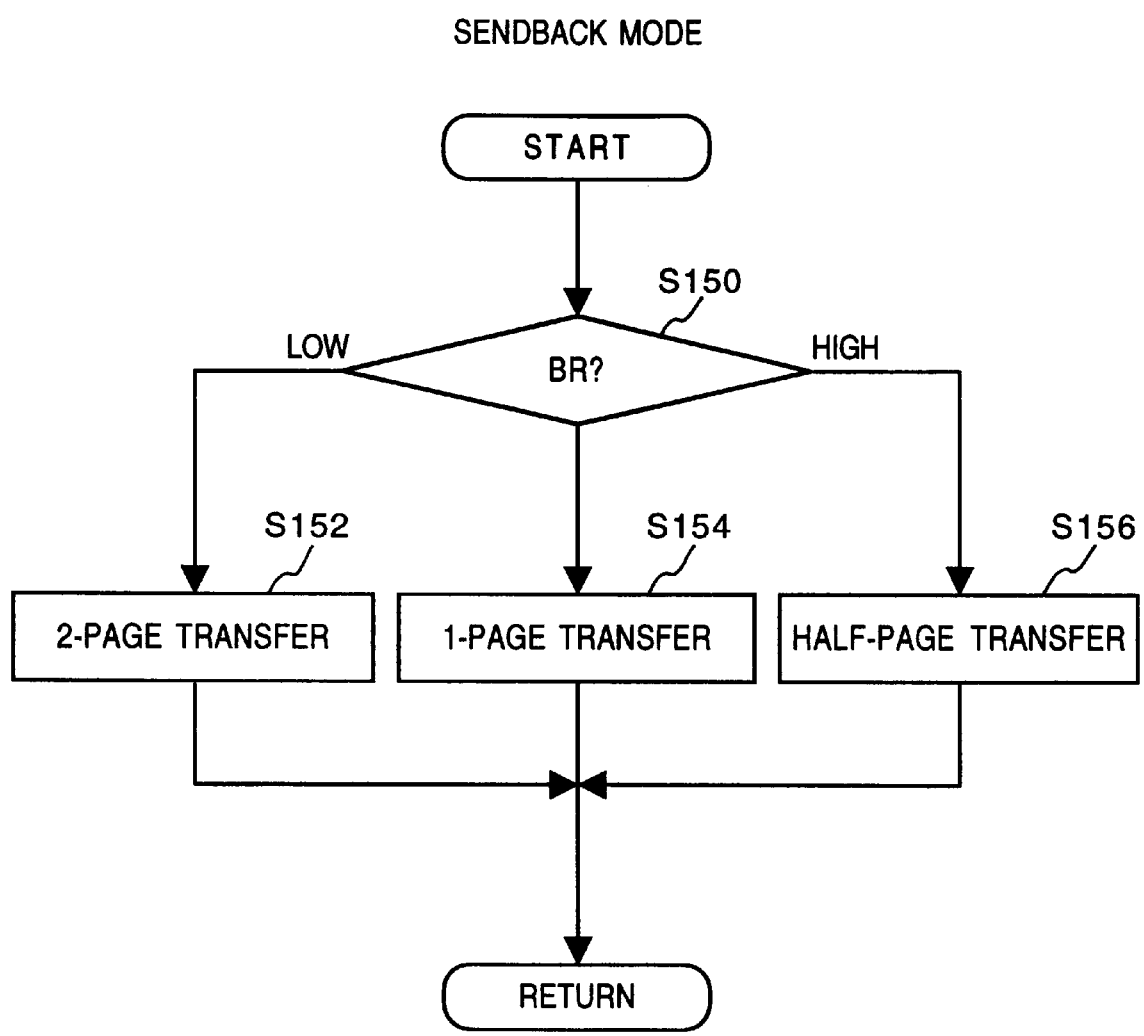
FIG. 12 is a flow chart showing the control sequence for selecting different communication procedures in correspondence with the busy state.

FIG. 12 is a flow chart showing the image data transfer routine in each apparatus. In step S150, the value BR, i.e., the busy rate of the network 4 is checked.

If BR is small (0<BR≦20), image data for two pages are transmitted to a destination apparatus in one frame in step S152. If one file includes 10 pages, the transfer operation of the file can be completed by transferring five frames. While the signal line is not too busy, even if long data is transferred, the influence (e.g., transmission of another apparatus is waited) on the entire system is small.

If BR has an intermediate value (20<BR≦60), the mode for sending image data for one page in one frame to a destination apparatus is executed in step S154. If one file includes 10 pages, the transfer operation of the file can be completed by transferring 10 frames.

If BR is large (BR>60), the mode for sending image data for half a page in one frame to a destination apparatus is executed in step S156. In this mode, if one file includes 10 pages, the transfer operation of the file can be completed by transferring 20 frames. With the half-page transfer mode, since the data amount per frame is reduced, the busy rate of the system can be prevented from further increasing.

Of course, when the busy rate is extremely high (e.g., BR>80), a mode for sending data for one line in one frame may be executed.

A case will be exemplified below wherein data is output from the reading device 10 to the printer apparatus 5.

The reading device 10 sends a control data frame to the printer apparatus 5 first. The printer apparatus 5 receives the control data frame, analyzes control data, and detects that image data frames following the control data, and the image data is sent in units of one page, two pages, or half a page.

Image data from the reader 1 is input to the controller 2 via the connector 115. Original information read by the reader 1 is input to the compression circuit 121 via the connector 120. When image data is to be output by the printer, the data is not compressed by the compression circuit 121 but is input to the memory 122. Image data from the memory 122 is input to the network interface circuit 123.

The CPU 125 outputs image data in units of one page, two pages, or half a page in correspondence with the communication state (value BR) of the network 4 via the connector 125. The image data on the network 4 is printed by the printer apparatus 5.

With the above-mentioned processing, information read by the reader 1 can be printed by the printer apparatus 5.

Note that the dividing modes of image data are not limited to the above-mentioned line, half-page, 1-page, and 2-page modes, and these modes are merely examples.

Facsimile Transmission

A case will be exemplified below wherein facsimile transmission is performed from the reading device 10 via the facsimile device 6. As described above, when a user depresses the FAX switch 32 (FIG. 5), the user inputs data for designating a facsimile device to be used, telephone number data of a destination, transmission mode data (immediate or timer transmission mode), designated transmission time data, and the like, using the ten-key pad 33.

Immediate Transmission

The immediate transmission is called "direct communication" in a normal facsimile device, and in this mode, an image read by a reading sensor is sent to a transmitter in units of lines without being stored in a memory. A case will be described below with reference to FIG. 13 and the like wherein the immediate transmission mode is designated by the user.

The reading device 10 transfers data input by the user to the facsimile device 6 together with a control data frame. Upon reception of these data, the facsimile device 6 can prepare for reception of image data which follows, i.e., reception in units of lines.

The facsimile device 6 connects a telephone line to a destination.

In the immediate transmission mode, as shown in FIG. 13, each time the reading device 10 reads an original image for one line, it sends the image data to the facsimile device 6, and the facsimile device 6 sends the read image data to the destination via the telephone line.

More specifically, image data read by the reader 1 of the reading device 10 is input to the controller 2 via the connector 115. The controller 2 controls the compression circuit 121 to compress the read image data. The compressed image data, i.e., encoded data for facsimile transmission, is input to the network interface circuit 123 without being stored in the memory 122. The CPU 125 (FIG. 4) of the reading device outputs encoded data for line onto the network 4 via the connector 124.

In the immediate transmission mode, image data is sent in units of lines for the following reason. More specifically, in the immediate transmission mode, image data is transmitted in units of lines since facsimile transmission performed by the facsimile device 6 and the image reading operation performed by the reading device 10 must be synchronized with each other in real time. That is, whether image is transmitted divisionally or simultaneously is controlled between the reading device 10 and the facsimile device 6 in correspondence with the communication state of the network.

Compressed data on the network is input to the network interface circuit 409 via the connector 8 (FIG. 8) of the facsimile device 6. An output signal 453 from the network interface circuit 409 is stored in the memory B 406 under the control of the memory controller 404. The CPU 412 connects the memory B 406 of the memory controller 404 to the CPU bus 462. The CPU 412 sequentially reads out encoded data from the memory B 406, and transfers the readout data to the MODEM 414. The MODEM 414 modulates the encoded data, and transmits it onto the telephone line via the NCU.

Non-time Designation Transmission

In facsimile communications, the reading device 10 is preferably released from the original reading device as soon as possible. To achieve this, the reading device 10 reads an image for one page (or one or more pages), and temporarily stores the read image in a memory. Thereafter, the stored image is compressed to facsimile codes, and the compressed data is temporarily stored in the memory 122 (FIG. 4). The reading device 10 sends the data stored in the memory 122 to the facsimile device 6. Such a facsimile transmission mode is called a non-time designation transmission mode. In the non-time designation transmission mode, image data to be transferred to the facsimile device 6 is divided in correspondence with the busy rate of the network 4.

Timer Transmission

The timer transmission mode in facsimile transmission will be exemplified below. FIG. 14 shows the timer transmission sequence. The difference between the timer transmission mode and the immediate transmission mode is that original images can be simultaneously read and all the image data can be simultaneously transferred to the facsimile device 6 since actual transmission is performed later. Control data is sent prior to transmission of image data in the same manner as in the immediate transmission mode.

The reader 1 reads all original images in turn, and the read image data are compressed to facsimile codes by the compression circuit 121. The compressed data are stored in the memory 122. In this case, the compressed original data corresponding to the number of originals are stored in the memory 122.

The CPU 125 outputs all the compressed data via the connector 124. In this case, the CPU 125 divides image data as needed in correspondence with the busy rate of the network 4 in accordance with the control sequences shown in FIGS. 11 and 12.

The compressed data on the network 4 is input to the network interface 409 via the connector 400. An output signal 453 from the network interface circuit 409 is stored in the memory A 405 under the control of the memory controller 404. The CPU 412 connects the memories A 405 and B 406 to the bus line 463 of the CODEC 411. The CODEC 411 reads out the compressed data from the memory A 405, encodes the data in correspondence with the encoding method of a destination of FAX transmission, and writes the encoded data in the memory B 406.

When the transmission time has reached, the CPU 412 connects the memory B 406 of the memory controller 404 to the CPU bus 462. The CPU 412 sequentially reads out the encoded data from the memory B 406, and transfers the readout data to the MODEM 414. The MODEM 414 modulates the encoded data, and transmits it onto the telephone line via the NCU.

Filing of Image data

As shown in FIGS. 8 and 9, in this system, both the reading device 10 and the filing apparatus 7 have the compression circuits (the compression/expansion circuit in the filing apparatus 7). In order to file image data, the compression method in the filing apparatus 7 must be the one that is compatible with the filing apparatus 7 since image data is expanded by the filing apparatus 7. Thus, when image data read by the reading device 10 is stored in the filing apparatus 7, and these two apparatuses have different compression methods, the reading device 10 directly transfers the image data to the filing apparatus 7 without compressing it since the compression method of the filing apparatus 7 has priority over that of the reading device 10. On the other hand, when the two apparatuses have the same compression method, the reading device 10 compresses the read image data, and transfers the compressed image data to the filing apparatus. The filing apparatus 7 stores the compressed data in a storage medium.

In order to file images, a user depresses a file switch 35 (FIG. 5). Then, the display 34 displays a message urging a user to designate a filing apparatus. Assume that the user designates the filing apparatus 7.

FIG. 15 shows the data flow between the reading device 10 and the filing apparatus 7. The reading device 10 sends, to the filing apparatus, a message frame indicating that the filing apparatus 7 is designated. The filing apparatus 7 informs the compression method of its own compression circuit (504 in FIG. 9) to the reading device 10. The reading device 10 informs, to the filing apparatus 7, if the compression method is the same or different. The filing apparatus 7 can detect based on this information whether or not it needs to compress data sent from the reading device 10.

In this manner, preparation for image data transfer is established between the reading device 10 and the filing apparatus 7. The reading device 10 begins to read original images.

Image data from the reader 1 is input to the controller 2 via the connector 115. The controller 2 determines depending on the matching state of the compression methods of the two apparatuses whether the image data is input to the compression circuit 121 via the connector 120 or is stored in the memory 122 in the form of raster data. When the reading device 10 adopts the same compression method as that of the filing apparatus 7, the image data is compressed by the compression circuit 121 in the controller. The compressed image data is stored in the memory 122 in correspondence with the number of originals. When the reading device 10 adopts a different compression method from that of the filing apparatus 7, the image data is stored in the memory 122 in the form of raster data in correspondence with the number of originals.

The CPU 125 outputs all the compressed data (when the two apparatuses have the same method) or raster data (when the two apparatuses have different methods) onto the network via the connector 124 together with file name data.

As described above, transmission data may be divided in correspondence with the busy state of the network 4.

In the filing apparatus 7, the compressed or raster data on the network 4 are input to the network interface circuit 503 via the connector 500.

When the two apparatuses have the same method, the network interface circuit 503 inputs the received raster data to the compression/expansion circuit 504 in accordance with an instruction from the CPU 516. The raster data are individually converted into compressed data 552. The compressed data 552 are input to the memory controller 510. The memory controller 510 stores the compressed data 552 in the memory A 506. The CPU 516 connects the memories A 506 and B 507 of the memory controller 510 to the bus line 570 of the CODEC 517. The CODEC 517 reads out the compressed data from the memory A 506, encodes the readout data by the MR method, and writes the encoded data in the memory B 507. Upon completion of encoding by the CODEC 517, the CPU 516 connects the memory B 507 of the memory controller 510 to the CPU bus 560. The CPU 516 sequentially reads out the encoded data from the memory B 507, and transfers the readout data to the SCSI controller 519. The SCSI controller 519 stores encoded data 572 in the external storage device 573.

In this manner, since the filing apparatus 7 can omit the compression processing, the filing apparatus 7 can share its performance with another processing, i.e., expansion processing of another image data requested by the computer apparatus 8.

When the two apparatuses have the same compression method, the CPU 516 instructs the interface 503 and the memory controller 510 to store the received data in the memory A 506 via the line 552. The CPU 516 connects the memories A 506 and B 507 of the memory controller 510 to the bus line 570 of the CODEC 517. The CODEC 517 reads out compressed data from the memory A 506, encodes the compressed data by the MR method, and writes the encoded data in the memory B 507. Upon completion of encoding by the CODEC 517, the CPU 516 connects the memory B 507 of the memory controller 510 to the CPU bus 560. The CPU 516 sequentially reads out the encoded data from the memory B 507, and transfers the readout data to the SCSI controller 519. The SCSI controller 519 stores encoded data 572 in the external storage device 573.

In this manner, whether image data is transmitted divisionally or simultaneously is controlled even between the filing apparatus and the reading device in correspondence with the communication state on the network.

In the above embodiment, the filing operation of data from the reading device 10 to the filing apparatus 7 has been exemplified. However, the present invention is not limited to this. More specifically, according to the present invention, the output apparatus is not limited to the filing apparatus. Whether or not the compression methods of input and output apparatuses are the same is taken into account, and when the same compression method is adopted, the input apparatus performs compression to reduce the load on the output device; when different methods are adopted, the output apparatus performs compression to assure data compatibility.

As many apparently widely different embodiments of the present invention can be made without departing from the spirit and scope thereof, it is to be understood that the invention is not limited to the specific embodiments thereof except as defined in the appended claims.

What is claimed is:

1. An information processing system having first and second processing apparatuses connected to a network, the first processing apparatus being capable of transmitting image data to the network, and the second processing apparatus being capable of receiving the image data from the network, said system comprising:

detecting means for detecting a communication state on the network; and control means for controlling transmission of the image data from the first processing apparatus to the second processing apparatus via the network, said control means operable in a plurality of transmission modes in each of which image data is transmitted in units of a plurality of blocks, a block for one of the plurality of transmission modes having a size different from that of a block for another transmission mode, said control means including transmission mode selection means for selecting one of the plurality of transmission modes in accordance with the communication state on the network detected by said detecting means, and means for adding control data indicating the selected transmission mode to the image data to be transmitted.

2. The system according to claim 1, wherein said detecting means detects a data traffic on the network, and said transmission mode selecting means selects one of the different transmission modes in accordance with the detected data traffic on the network.

3. The system according to claim 1, wherein the first processing apparatus comprises compression means for compressing image data to be transmitted and said control means controls an operation of said compression means.

4. The system according to claim 1, wherein the first processing apparatus comprises image reading means for reading an image of an original and for outputting image data to be transmitted.

5. The system according to claim 1, wherein a block contains a page of image data or a plurality of pages of image data, dependent upon the selected transmission mode selected by the transmission mode selection means.

6. The system according to claim 1, wherein a block contains a page of image data or a fraction of a page of image data, dependent upon the selected transmission mode selected by the transmission mode selection means.

7. An information processing apparatus connected to a network, for exchanging image data with another apparatus via the network, comprising:

transmitting means for transmitting image data to the network, said transmitting means operable in a plurality of transmission modes in each of which image data is transmitted in units of a plurality of blocks, a block for one of the plurality of transmission modes having a size different from that of a block for another transmission mode;

detecting means for detecting a communication state on the network; and control means for controlling the transmission of the image data to the network by said transmitting means, said control means including transmission mode selecting means for selecting one of the different transmission modes in accordance with the communication state detected by said detecting means;

wherein said transmitting means is also for transmitting control data indicating the selected transmission mode prior to transmission of the image data.

8. The apparatus according to claim 7, wherein said detecting means detects a data traffic on the network, and said transmission mode selecting means selects one of the different transmission modes in accordance with the detected data traffic on the network.

9. The apparatus according to claim 7, further comprising compression means for compressing image data to be transmitted, said control means controlling an operation of said compressing means.

10. The apparatus according to claim 7, further comprising image reading means for reading an image of an original and for outputting image data to be transmitted.

11. The apparatus according to claim 7, wherein a block contains a page of image data or a plurality of pages of image data dependent upon the selected transmission mode.

12. The apparatus according to claim 7, wherein a block contains a page of image data or a fraction of a page of image data dependent upon the selected transmission mode.

13. A data transfer control method for transmitting image data between communication apparatuses in a network including a plurality of communication apparatuses, comprising the steps of:

detecting a communication state on the network;

selecting one of different transmission modes in accordance with the communication state detected at said detecting step, wherein the image data is transmitted in units of a plurality of blocks, and a block for one of the plurality of transmission modes has a size different from that of a block for another transmission mode, and transmitting the image data in accordance with the transmission mode selected at said selecting step with control data indicating the selected transmission mode.

14. The method according to claim 13, wherein a data traffic on the network is detected at said detecting step, and one of the different transmission modes is selected at said selecting step in accordance with the detected data traffic on the network.

15. The method according to claim 13, further comprising a compressing step of compressing image data to be transmitted.

16. The method according to claim 13, further comprising a reading step of reading an image of an original so as to output image data to be transmitted.

17. The method according to claim 13, wherein a block contains a page of image data or a plurality of pages of image data, dependent upon the selected transmission mode.

18. The method according to claim 13, wherein a block contains a page of image data or a fraction of a page of image data, dependent upon the selected transmission mode.

* * * * *

UNITED STATES PATENT AND TRADEMARK OFFICE
CERTIFICATE OF CORRECTION

PATENT NO. : 5,903,722  
DATED : May 11, 1999  
INVENTOR(S) : Masanori Sakai et al.

It is certified that error appears in the above-identified patent and that said Letters Patent is hereby corrected as shown below:

Title page,
Item [75], line 5, delete "Tama" following Yoshinori Abe and insert therefor -- Tokyo --.

Column 6,
Line 5, after "105", insert -- 106, --.

Column 11,
Line 9, delete "($0<BR \leqq 20$)" and insert therefor -- ($0<BR \leq 20$) --.
Line 9, delete "($0<BR \leqq 60$)" and insert therefor -- ($0<BR \leq 60$) --.

Signed and Sealed this

Fourteenth Day of August, 2001

*Attest:*

*Attesting Officer*

NICHOLAS P. GODICI  
*Acting Director of the United States Patent and Trademark Office*